UNITED STATES PATENT OFFICE.

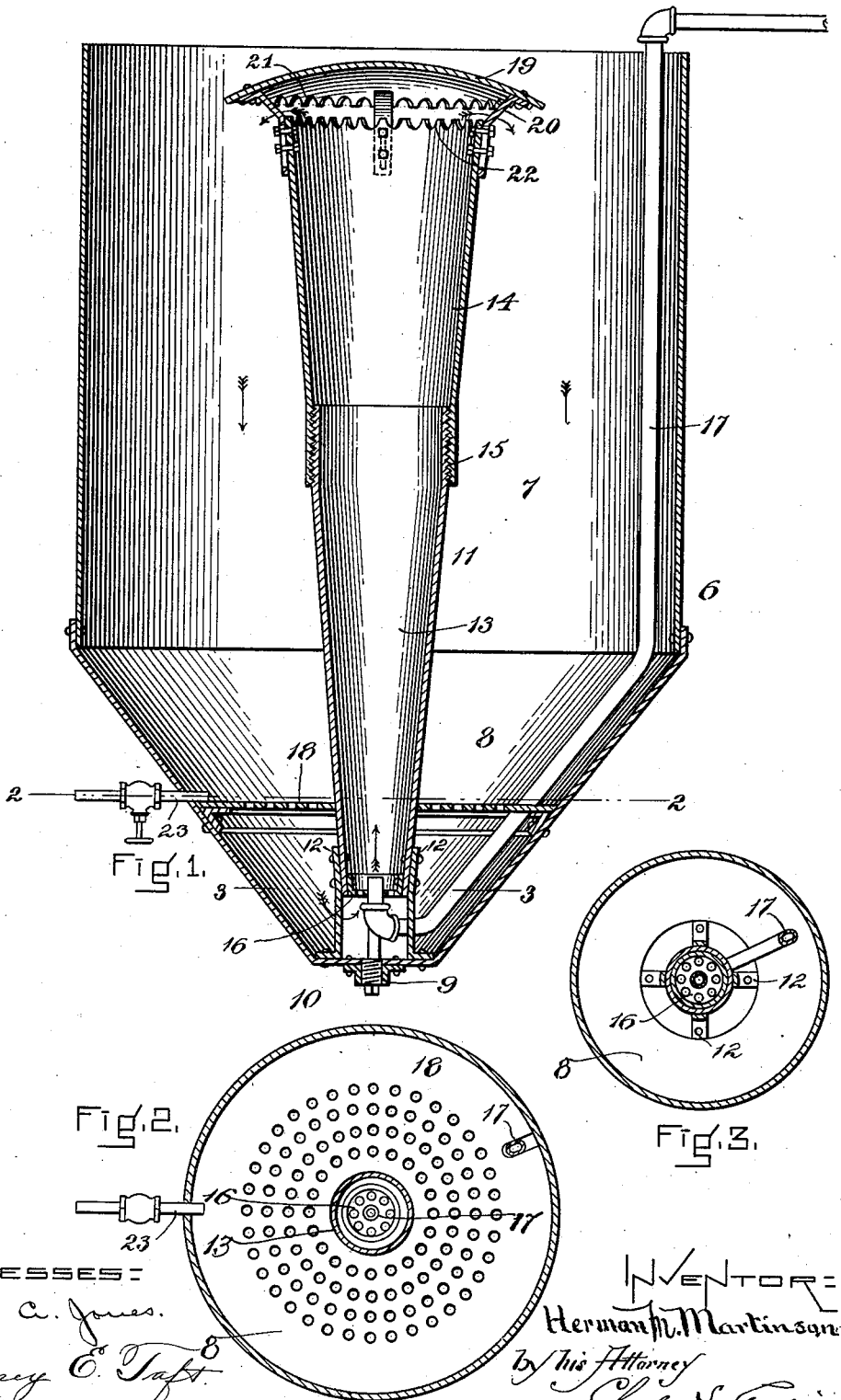

HERMAN M. MARTINSON, OF RUMFORD FALLS, MAINE.

AGITATOR.

SPECIFICATION forming part of Letters Patent No. 708,058, dated September 2, 1902.

Application filed November 22, 1901. Serial No. 83,239. (No model.)

*To all whom it may concern:*

Be it known that I, HERMAN M. MARTINSON, a subject of the King of Sweden and Norway, residing at Rumford Falls, in the county of Oxford and State of Maine, have invented new and useful Improvements in Agitators, of which the following is a specification.

The object of this invention is to produce an agitator or vessel for thoroughly mixing together different ingredients. Said ingredients may be all liquids or partly liquid and partly in the form of solids suspended in said liquid.

My improved agitator is particularly adapted to mixing particles of wood with acid and water in the manufacture of wood-pulp, and again is adapted for mixing starch, sugar, and water in the process of making starch, and again for mixing the mash in a brewery.

The invention consists in a reservoir, a mixing-chamber located in said reservoir provided with an outlet and an inlet opening, an agitator-pipe leading from the interior of said mixing-chamber to a source of power, and a perforated partition located within said mixing-chamber.

The invention again consists in the elements hereinbefore set forth, in combination with a perforated partition surrounding the exterior of said mixing-chamber.

The invention again consists in a reservoir, a mixing-chamber in said reservoir, and means for adjusting the different parts of which said mixing-chamber is constructed to different positions with relation to each other, and thus varying the distance between the inlet and outlet openings in said mixing-chamber.

The invention further consists in certain details of construction and in the combination and arrangement of parts set forth in the following specification and particularly pointed out in the claims thereof.

Referring to the drawings, Figure 1 is a vertical longitudinal section of my improved agitator. Fig. 2 is a horizontal section taken on line 2 2 of Fig. 1. Fig. 3 is a horizontal section taken on line 3 3 of Fig. 1.

Like numerals refer to like parts throughout the several views of the drawings.

In the drawings, 6 is a reservoir constructed of any desirable material formed in the shape of a cylinder 7, with a conical-shaped bottom 8, having an outlet-opening 9, which is closed by a plug 10, said outlet-opening being for the purpose of emptying the agitator when the contents thereof are thoroughly mixed together. In the interior of the reservoir 6 is a mixing-chamber 11, preferably conical in shape, with the smaller end thereof located near the bottom of the reservoir. Said mixing-chamber is supported upon standards 12, fastened to the bottom of the reservoir 6 by bolts, and is preferably constructed in parts, two or more, adjustable lengthwise upon each other. Said means of adjustment may be varied without departing from the spirit of my invention; but I have illustrated a mixing-chamber as made in two parts 13 and 14, conical in shape, except at the point where they are adjusted one upon the other, and at that point they are made cylindrical, and one of said parts is provided with an exterior screw-thread 15 to engage an interior screw-thread formed upon the other part.

Adjacent to the lower end of the part 13 is fastened a perforated plate 16, and to said plate is attached an agitator-pipe 17, which extends downwardly from the lower end of said mixing-chamber, thence turning and passing upwardly through the reservoir, and after passing outwardly therefrom is connected to a source of power, either steam or compressed air.

A perforated partition 18 surrounds the exterior of the mixing-chamber 11 and extends from said mixing-chamber across the space intervening between said mixing-chamber and the walls of the reservoir 6. While I have shown only one of said perforated partitions, it is evident that a number may be placed at different heights in the reservoir, if desirable. At the outlet end or top of the mixing-chamber 11 I provide a cap 19 to prevent the liquid from being discharged beyond the walls of the reservoir from the mixing-chamber. Said cap is attached to the part 14 of the mixing-chamber by angle-irons 20. The edge 21 of the cap 19 is notched or corrugated, and the outlet end of the mixing-chamber is notched at 22, the purpose of these notched edges of the outlet-opening being to thoroughly mix the liquid and solid substances together as they pass from the mixing-chamber 11 out into the reservoir 6.

The operation of the device as a whole is as follows: The liquids and other articles to be mixed together are placed in the reservoir 6 and the compressed air or steam admitted through the agitator-pipe 17, discharging in the direction of the arrow, Fig. 1, into the lower end of the mixing-chamber 11, thus drawing the particles to be mixed into the mixing-chamber at the lower end and forcing them out at the upper end in the direction of the arrows, Fig. 1. As the liquid and solid substances are thus driven through the mixing-chamber 11 and out into the reservoir they pass through the perforations in the partition 18 and also through the perforations in the plate 16, thus becoming very thoroughly and quickly mixed.

In Fig. 1 I have shown an outlet-pipe 23, of which there may be several, if found necessary, for the purpose of drawing off the sediment from the agitator at a point above the perforated partition 18.

While I have described the agitating medium introduced through the agitator-pipe 17 as steam or compressed air, I do not intend to be understood as limiting my invention to the employment of either of these two mediums.

Having thus described my invention, what I claim, and desire by Letters Patent to secure, is—

1. In an agitator, a reservoir, a mixing-chamber in said reservoir, provided with an inlet and an outlet opening, said chamber made in parts, and means to adjust said parts longitudinally with relation to each other to vary the distance between the inlet and outlet openings in said mixing-chamber.

2. In an agitator, a reservoir, a mixing-chamber in said reservoir, provided with an inlet and an outlet opening, said chamber made in parts, means to adjust said parts longitudinally with relation to each other and vary the distance between the inlet and outlet openings in said mixing-chamber, and an agitator-pipe leading from the interior of said mixing-chamber to a source of power.

3. In an agitator, a reservoir, a mixing-chamber in said reservoir, provided with an inlet and an outlet opening, and an agitator-pipe leading from the interior of said mixing-chamber to a source of power, the outlet end of said mixing-chamber being notched for the purpose set forth.

4. In an agitator, a reservoir, a mixing-chamber in said reservoir, provided with an inlet and an outlet opening, an agitator-pipe leading from the interior and lower end of said mixing-chamber to a source of power, and a cap fast to said mixing-chamber and extending across said outlet-opening at a distance therefrom, whereby an annular space is provided between said cap and the outlet end of said mixing-chamber.

5. In an agitator, a reservoir, a mixing-chamber in said reservoir, provided with an inlet and an outlet opening, an agitator-pipe leading from said inlet-opening to a source of power, and a cap fast to said mixing-chamber and extending across said outlet-opening, the edge of said cap being notched for the purpose set forth.

6. In an agitator, a reservoir, a mixing-chamber in said reservoir, provided with an inlet and an outlet opening, said chamber being conical in shape, the large end of said mixing-chamber constituting the outlet-opening thereof and the small end of said mixing-chamber constituting the inlet-opening thereof, and an agitator-pipe leading from said inlet-opening to a source of power.

In testimony whereof I have hereunto set my hand in presence of two subscribing witnesses.

HERMAN M. MARTINSON.

Witnesses:
RALPH T. PARKER,
ARTEMAS W. WING.